United States Patent [19]

Endoh et al.

[11] Patent Number: 4,481,558

[45] Date of Patent: Nov. 6, 1984

[54] WOUND FOIL TYPE FILM CAPACITOR

[75] Inventors: Hiromi Endoh, Nagano; Katsutoshi Uraki, Kawasaki; Akira Miyamoto, Suzaka, all of Japan

[73] Assignee: Fujitsu Limited, Kawasaki, Japan

[21] Appl. No.: 428,287

[22] Filed: Sep. 29, 1982

[30] Foreign Application Priority Data

Oct. 6, 1981 [JP] Japan .................. 56-158996

[51] Int. Cl.³ .................. H01G 1/01; H01G 4/08; H01G 7/00
[52] U.S. Cl. .................. 361/303; 29/25.42; 361/323
[58] Field of Search .................. 361/303, 323, 324; 29/25.42

[56] References Cited

U.S. PATENT DOCUMENTS

| 2,627,645 | 2/1953 | Harris ................... 29/25.42 |
| 2,835,153 | 5/1958 | Langton ................. 80/19 |
| 3,049,651 | 8/1962 | Adelson et al. ........ 361/323 X |
| 3,128,547 | 4/1964 | Manning et al. ....... 29/25.42 X |
| 3,773,585 | 11/1973 | Butcher ................. 29/25.42 X |
| 4,233,832 | 11/1980 | Rowell .................. 72/91 |

FOREIGN PATENT DOCUMENTS

| 2246422 | 9/1972 | Fed. Rep. of Germany . |
| 2354152 | 1/1978 | France . |
| 26568 | 8/1971 | Japan . |

*Primary Examiner*—Donald A. Griffin
*Attorney, Agent, or Firm*—Staas & Halsey

[57] ABSTRACT

This invention is characterized by providing a wound foil type film capacitor having the specified capacitance, particularly 100 pF or less by using the electrode film which has been manufactured by stretching the wire material of aluminium or copper etc. and formed into the specified width dimension at the time of winding and by winding it together with the dielectric film for the specified number of turns.

8 Claims, 14 Drawing Figures

WOUND FOIL TYPE FILM CAPACITOR

BACKGROUND OF THE INVENTION

1. Field of the Invention:

This invention relates to an electrode film for a foil type film capacitor. Capacitors of this type include a paper capacitor, metallized paper capacitor, plastic film capacitor. This invention is particularly effective when it is applied to a plastic film capacitor.

2. Description of the Prior Art:

As shown in FIG. 1, a plastic film capacitor is generally manufactured by the following. Two sheets of dielectric film 1, 2 and two sheets of electrode film 3, 4 are alternately layered and wound by a winding machine. Then, after the lead terminals (not shown) are respectively fixed to the electrode films 3, 4, this wound body is heated and baked. FIG. 2 is a view of a plastic film capacitor thus manufactured. In this capacitor, the lead terminals 5, 6 are led out in the same direction from the wound body 7.

The dielectric films 1, 2 are composed of a plastic film such as the polystylene, polyethylene-terephtalete or polypropylene, while the electrode films 3, 4 are composed of a metal film such as aluminium, copper or tin.

The dielectric films 1, 2 of the capacitor have a thickness in the range of several $\mu m$ to several tens of $\mu m$ depending on the rated voltage.

On the other hand, the thickness of the electrode films 3, 4 are not related to the static capacitance of the capacitor, and when the film is thick, only the volume of capacitor increases and it is very uneconomical from the point of view of material cost. Therefore, the electrode films 3, 4 must be as thin as possible and in general, have a thickness selected in the range of 6.5 $\mu m$ to several tens of $\mu m$.

The static capacitance C, of the wound foil type film capacitor is given by the following equation.

$$C = 2\epsilon S/3.6\pi \cdot d \text{ (pF)}$$

where,
S: Overlapping area of two Electrode films (cm$^2$)
d: Dielectric film thickness (cm)
$\epsilon$: Dielectric constant of dielectric film In general, a plastic film capacitor has a capacitance in the range of several tens pF to several tens of thousand pF. This capacitor has various advantages, such as a linear temperature characteristic, less dielectric absorption and dielectric strain, a small allowable difference of static capacitance, and is widely used in electronic devices.

However, a capacitor of this type also has disadvantages. For instance, a capacitor having a small capacitance has a large fluctuation in capacitance and high cost as compared with a capacitor having a large capacitance. This is because a very narrow width electrode film is required for manufacturing a plastic film capacitor of 100 pF or less; that is, a capacitor having a very small capacitance value ranging from several pF to several tens of pF. Namely, in the case of an ordinary electrode film, an ingot of for example, aluminium is stretched to form a metal film 8 having a large area as shown in FIG. 3A. Thereafter, a constant tension is applied to this metal film 8 and it is cut by a slitter while it is, under this tension and thereby, the electrode film 8a of a specified width is obtained as shown in FIG. 3B.

Conventionally, no matter how excellent the cutting ability of the slitter, the width of film is restricted because of the mechanical strength of film itself. Particularly, a metal such as aluminium is very fragile and malleable and therefore a film having a thickness of several tens of $\mu m$ or less is limited to a minimum film width of about 4 mm. In the case of using a metal film having a thickness of several tens of $\mu m$ or more, the cutting of film having a thickness of 4 mm or less is possible but, burs are generated during the cutting operation because the high mechanical strength of the film.

FIG. 3C is a sectional view of an enlarged section of the film 8a. As shown in the figure, burs 9 are easily generated at the time of cuting the ordinary film 8a into the specified width and the edge 10 is angled. Therefore, when a capacitor is manufactured using such a film 8a, burs 9 may pass through the dielectric film resulting in the short-circuit or the edge 10 may pass into the dielectric film making it thinner. As a result, the dielectric breakdown may often occur.

On the other hand, a winding machine is used for winding a plastic film capacitor and currently an automatic winder is almost always used. To this automatic winder, a static capacitance or number of windings are previously input. Thus, the plastic film and electrode film, layered alternately, are wound automatically until the static capacitance or the number of turns of winding reaches the specified preset value. In the case of manufacturing a capacitor having a small capacitance of under 100 pF, the required capacitance value can be obtained only by several turns of the films (about 2 to 3 turns in case the diameter is about 3 mm) when an ordinary electrode film having a width of 4 mm or more is used.

Therefore, the manufacturing yield of a capacitor having a small capacitance is extremely poor, and it has actually been impossible to manufacture a capacitance of under 100 pF using an automatic winder. With this background, in the case of manufacturing existing plastic film capacitor of 100 pF or less, a worker must wind the electrode film which has been cut in such a manner as to have a width of 4 mm or more and the specified length, by inserting it manually between the dielectric films using a manual winder. The many manufacturing steps explained above results in only expensive capacitors.

SUMMARY OF THE INVENTION

It is the first object of the present invention to provide a highly reliable wound foil type film capacitor which solves the existing electrode film short-circuit and dielectric film breakdown problems.

It is the second object of the present invention to provide an economical and highly reliable plastic film capacitor having a small capacitance value.

These objects are attained by a wound foil type film capacitor and a method of manufacturing the same characterized in a wound foil type film capacitor comprising at least two sheets of dielectric film and electrode film layered alternately, such that at least one of the electrode films is obtained by stretching the wire material comprising aluminum, copper etc. and forming it into the specified width dimensions at the time of winding. Moreover, such objects can also be attained by providing a wound foil type film capacitor of a small capacitance value by setting the specified dimension of the electrode film to 4 mm or less.

DETAILED DESCRIPTION OF THE PREFERRED EMBODIMENTS

Figure 1:
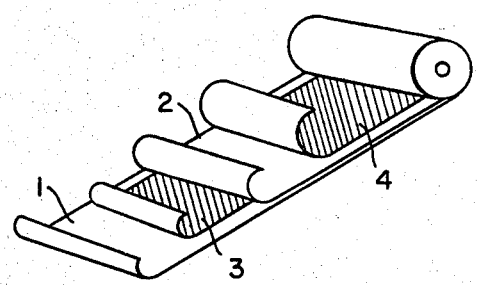
FIG. 1 is a perspective view of the structure of a general plastic film capacitor.
Figure 2:
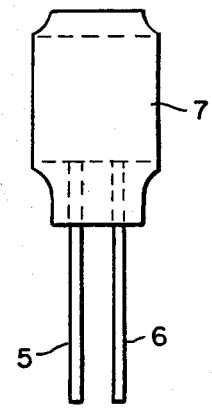
FIG. 2 is a plan view of a completed general plastic film capacitor.
Figure 3A:
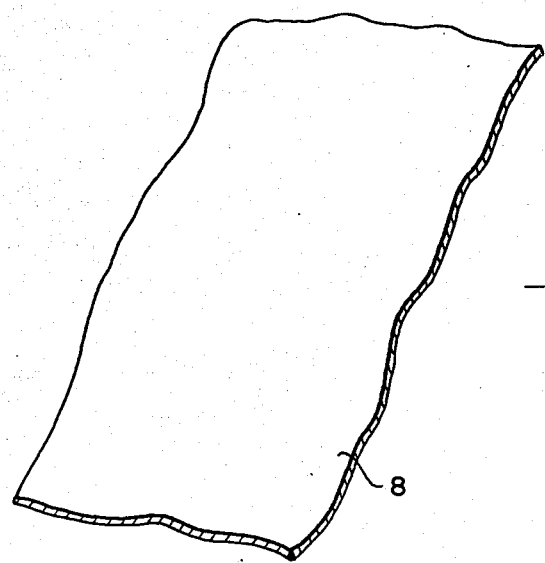
FIG. 3A is a perspective view of a metal film under tension.
Figure 3B:
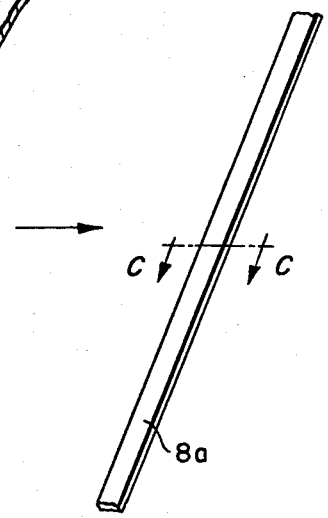
FIG. 3B is a perspective view of the conventional electrode film being cut into a specified width.
Figure 3C:
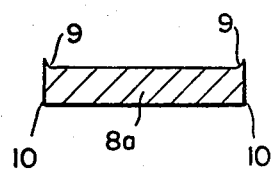
FIG. 3C is a sectional view of the film cut along the line C—C shown in FIG. 3B.

The preferred embodiment of the present invention is explained below by referring to FIG. 4 to FIG. 9. The electrode film 11 (FIG. 4B) of the present invention is formed by stretching the wire material 12 (FIG. 4A) which is comprises a light alloy such as aluminum and has a circular cross-section. At a time, this stretching process must be carried out in such a manner that the width dimension of electrode film 11 becomes equal to the specified dimensions when the film is used as a capacitor. An electrode film 11 thus formed has a round edge 11a as shown in the cross-sectional view of FIG. 4C, and the burs are not generated and the edge is not angled. Thus, avoiding the problems discussed with respect to FIG. 3C. For this reason, when manufacturing a plastic film capacitor using an electrode film 11, short-circuiting of the electrode film and dielectric film breakdown do not occur and a highly reliable capacitor is obtained.

On the other hand, the inventors of the present invention have found that as a result of manufacturing the wire materials in various diameters, it is possible to obtain a very thin electrode film having a width as narrow as 4 mm or less. Thereby, the inventors have attained the capability of using automatic winding process for manufacturing a plastic film capacitor having a capacitance as small as 100 pF or less. This process has been difficult to employ.

Table 1 shows the relation between the thickness and the width of a stretched material experimentally measured by the inventors. The aluminum wire material having a circular cross-section was used for this experiment. In the table 1, the resulting film widths when a material having a diameter in the range of 0.2 mm to 0.6 mm are stretched into the thickness of 10 $\mu$m to 70 $\mu$m are indicated.

TABLE 1

| Thickness ($\mu$m) | Wire diameter (mm) | | | | |
| --- | --- | --- | --- | --- | --- |
| | 0.2 | 0.3 | 0.4 | 0.5 | 0.6 |
| 10 | 3.0 | 5.7 | 8.9 | 12.5 | 16.4 |
| 20 | 1.5 | 2.8 | 4.5 | 6.3 | 8.2 |
| 30 | 1.0 | 1.9 | 3.0 | 4.2 | 5.3 |
| 40 | 0.7 | 1.4 | 2.3 | 3.2 | 4.2 |
| 50 | 0.6 | 1.1 | 1.8 | 2.5 | 3.3 |
| 60 | 0.5 | 0.9 | 1.5 | 2.1 | 2.7 |
| 70 | 0.4 | 0.8 | 1.3 | 1.8 | 2.3 |

From these results, an electrode film having a width of 3.0 mm can be formed by stretching a aluminum wire material having a diameter of 0.2 mm into a plate having a thickness of 10 $\mu$m, and an electrode film having a width of 2.5 mm can be obtained by stretching the wire material having a diameter of 0.5 mm into a plate having a width of 50 $\mu$m.

In the case of obtaining an electrode film having a width of 4 mm or less from the aluminum wire material, the electrode film becomes thick when using the material having a diameter of 0.7 mm or more, thereby the resulting capacitor becomes large in size. Namely, the resulting capacitor is uneconomical from the point of view of material cost. In addition, when a material having a diameter of 0.1 mm is used, the mechanical strength of the resulting electrode film becomes insufficient and thus it may easily be broken during winding. Therefore it is desirable when forming an electrode film having a width of 4 mm to use the material obtained by stretching the wire material having a diameter in the range of 0.2 mm to 0.6 mm into a plate having a thickness in the range of 10 $\mu$m to 70 $\mu$m. Such diameter and thickness criteria are also applied to the copper wire and tin wire.

Figures 4A, 4B:
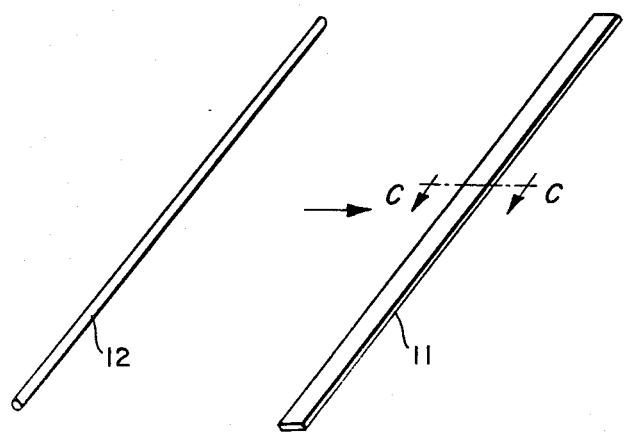
FIG. 4A is a perspective view of wire material.
FIG. 4B is a perspective view the wire material under tension.
Figure 4C:
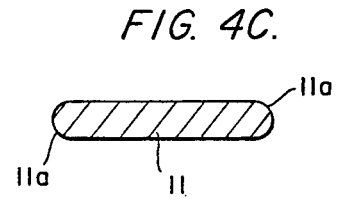
FIG. 4C is a sectional view of the film cut along the line C—C in FIG. 4B.
Figure 5:
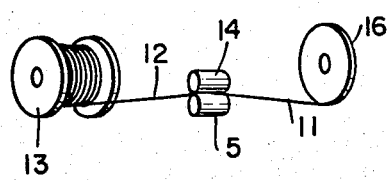
FIG. 5 illustrates the process of applying tension to the wire material according to the present invention.

The wire material 12 is stretched as shown in FIG. 5, by taking up it with the reel 16 through the rollers 14, 15 from the reel 13. The wire material 12 is changed into an electrode film 11 as shown in FIG. 4B while it is released from the rollers 14, 15. A very long electrode film in the form of tape can be formed very effectively by such stretching method.

Moreover, the stretched electrode film 11 is subjected to the annealing process for 30 to 60 minutes at a temperature of 300° C. to 400° C. in order to eliminate the effects of the stretching process strain. This process makes the electrode film softer, thus improving its winding ability. To perform this annealing process, when the reel 16 is formed with a heat resistant material, the reel 16 can be placed into a heating furnace for each wound electrode film 11, thus effective annealing can be executed.

In addition, the annealed material can directly be loaded to the automatic winding machine by using the reel 16 as the electrode film winding reel of said automatic winding machine.

In the case of having a manufacturing a plastic film capacitor of capacitance as small as 100 pF or less, the electrode film 11 of the present invention can be simply formed to have a width of 4 mm or less. Consequently, a longer film can be formed than previously obtainable.

As a result, since this invention allows a larger number of turns of electrode film 11 than the existing film, a capacitor having less capacitance fluctuation can be manufactured with good yield even when using an automatic winding machine.

Figure 6:
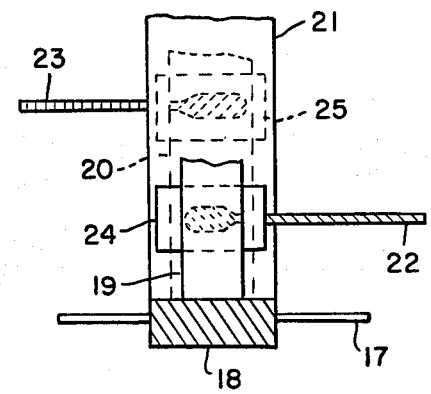
FIG. 6 is a plan view for explaining the winding process of a plastic film capacitor of the present invention.

FIG. 6 shows the lead terminal mounting structure on the winding of the plastic capacitor of the present invention. A wound body 18 on the winding shaft 17 is formed by winding two sheets of electrode film 19, 20 and two sheets of dielectric film 21 (the one dielectric film at the surface side of the paper is not illustrated for convenience of drawing) that are alternately layered. The electrode film 19 is 4 mm or less in width and it is formed by stretching the wire material as in the case explained above. On the other hand, the electrode film 20 is 4 mm or more in the width and it has been cut by the slittere as explained in FIG. 3.

In this embodiment, as shown in FIG. 6, the dielectric films 21 have the same width, while one of the electrode films 19 and 20 is narrower than the other. Thereby, the capacitance value is almost constant, even when the relative position of electrode films 19, 20 deviates a little in the width direction. Thereby a small capacitance plastic capacitor having only a small fluctuation in capacitance can be obtained with this deviation effect in addition to an increase of number of turns of winding as explained above.

The lead terminals 22, 23 having flat edges are welded to an adequate position of the electrode film 19 and then the layer are wound into the wound body 18 by the winding operation. The rectangular protection films 24, 25 comprising plastic film are arranged to cover the welding position of the lead terminals 22, 23 and are wound together with the films 19, 20, 21.

The protection films 24, 25 functions to further prevent occurrence of dielectric breakdown and short-circuit.

Only the dielectric film 21 must be additionally wound after the lead terminals 22, 23 and protection films 24, 25 are wound, in order to form the armoring portion. A wound body 18 thus formed is heated and baked after cutting away the films 19, 20, 21 and then used as a capacitor element.

Figure 8:
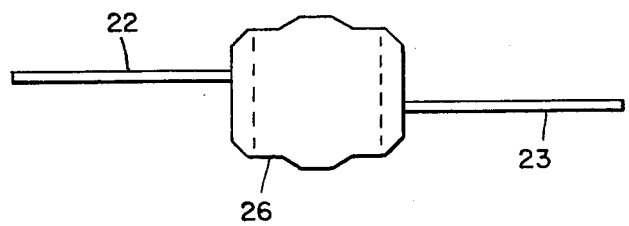
FIG. 8 and FIG. 9 are plan views of a completed plastic film capacitor of the present invention.

FIG. 8 is illustrates a small capacitance plastic film capacitor of the present invention manufactured by the wound structure shown in FIG. 6. This capacitor provides the lead terminals 22, 23 on opposite sides of the element 26. The center of element 26 is projected because the width of electrode film 19 is narrow.

Figure 7A:
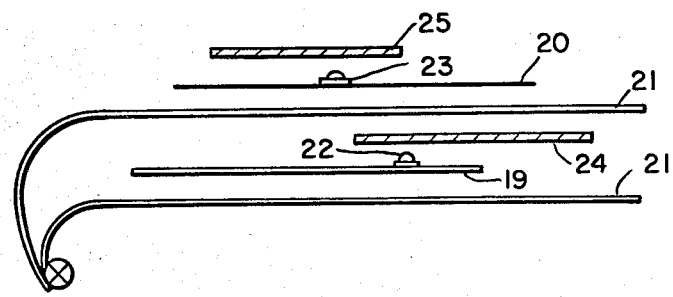
FIG. 7A is the side view of the winding of the present invention.
Figure 7B:
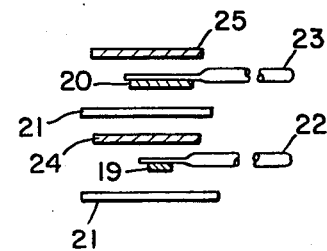
FIG. 7B is a sectional view of the windings shown in FIG. 7A.

FIG. 7A and FIG. 7B show the winding processes for manufacturing another type of small capacitance plastic film capacitor. This capacitor can be manufactured by the same winding process as that explained for FIG. 6, except for the point that the lead terminals 22, 23 are led out in the same direction.

Figure 9:
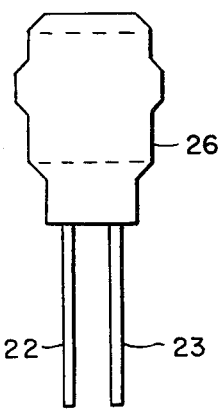

FIG. 9 shows a capacitor of the present invention manufactured with the winding structure of FIG. 7. An example of manufacturing this capacitor is explained below. The aluminum wire material having a diameter of 0.3 mm is formed into an electrode film, in the form of tape, having a thickness of 45 $\mu$m and a width of 1.3 mm by the stretching process of FIG. 5. This film is wound on the electrode film winding reel 16 of the automatic winding machine. The electrode film 20 in the form of a tape having a thickness of 6.5 $\mu$m and a width of 6 mm is wound to one reel. The dielectric film 21 having a thickness of 40 $\mu$m and a width of 10 mm is wound a second reel. Then a pair of these reels are prepared. Each reel is then loaded onto the automatic winding machine. A small capacitance plastic film capacitor of the type shown in FIG. 8 having a capacitance of 33 pF has been formed on an automatic winding machine with up to 30 turns.

As a result of measurement of these capacitors, the capacitance distribution ranges from 32.7 pF to 34.6 pF and the a reference deviation is 0.5 pF.

Meanwhile, the capacitance distribution of the capacitor of 33 pF manufactured by the conventional manual winding process was ranged from 30.1 pF to 36.2 pF and the reference deviation was 1.7 pF.

As explained above, the capacitor of the present invention is outstandingly better than the existing capacitor, that is, having a low fluctuation in capacitance value.

We claim:

1. A wound foil type film capacitor comprising;
   two sheets of dielectric films;
   two metal electrode films alternately layered between the two dielectric films, and the alternated layers being wound at least one of said electrode films is formed by stretching a round wire material having a circular cross-section to form the round wire material into a specified width at the time of winding.

2. A wound foil type film capacitor according to the claim 1, wherein said electrode films are obtained by stretching said round wire material having a circular cross-section and a diameter in the range of 0.2 to 0.6 mm into the electrode films having a thickness in the range 10 $\mu$m to 70 $\mu$m and a width of 4 mm or less.

3. A wound foil type film capacitor according to the claim 2, wherein said capacitor has a capacitance of 100 pF or less.

4. A wound foil type film capacitor according to claims 1, 2 or 3, wherein said stretched electrode film is annealed.

5. A wound foil type film capacitor according to claim 4, wherein said round wire material comprises aluminum or copper.

6. A wound foil type film capacitor according to claim 1, 2 or 3, wherein said round wire material comprises aluminum or copper.

7. A method of manufacturing a wound foil type film capacitor comprising at least two sheets of dielectric film and two electrode film layers being alternately layered between the at least two sheets of dielectric film, said method comprising the steps of:
   forming a first one of said electrode film layers by stretching a round aluminum or copper wire material having a circular cross-section to form the round wire material into a specified width at the time of winding;
   interleaving said at least two sheets of dielectric film and said first electrode film layer and the remaining electrode film layer;
   winding the interleaved layers to form a capacitor having a specified static capacitance.

8. A method of manufacturing a wound foil type film capacitor according to claim 7 further comprising the steps of:
   rolling said first electrode film onto a reel of an automatic winding machine;
   winding on the automatic winding machine said remaining electrode film and said at least two sheets of dielectric film, and thereby forming a small capacitance capacitor of 100 pF or less.

* * * * *

UNITED STATES PATENT AND TRADEMARK OFFICE
CERTIFICATE OF CORRECTION

PATENT NO. : 4,481,558

DATED : November 6, 1984

INVENTOR(S) : Endoh et al.

It is certified that error appears in the above-identified patent and that said Letters Patent is hereby corrected as shown below:

```
Column 1, line 48, after "tens" insert --of--.
Column 3, line 38, "this" should be --a--.
Column 4, line 58, "of" should be --having a--.
```

Signed and Sealed this

Nineteenth Day of March 1985

[SEAL]

Attest:

DONALD J. QUIGG

*Attesting Officer*     *Acting Commissioner of Patents and Trademarks*